Nov. 1, 1927.

H. E. NICHOLS 1,647,711

PORTABLE ELECTROCARDIOGRAPH

Filed May 6, 1924

Inventor
Horace E. Nichols
by
John W. Darley
Attorney

Nov. 1, 1927.
H. E. NICHOLS
1,647,711
PORTABLE ELECTROCARDIOGRAPH
Filed May 6, 1924
4 Sheets-Sheet 3
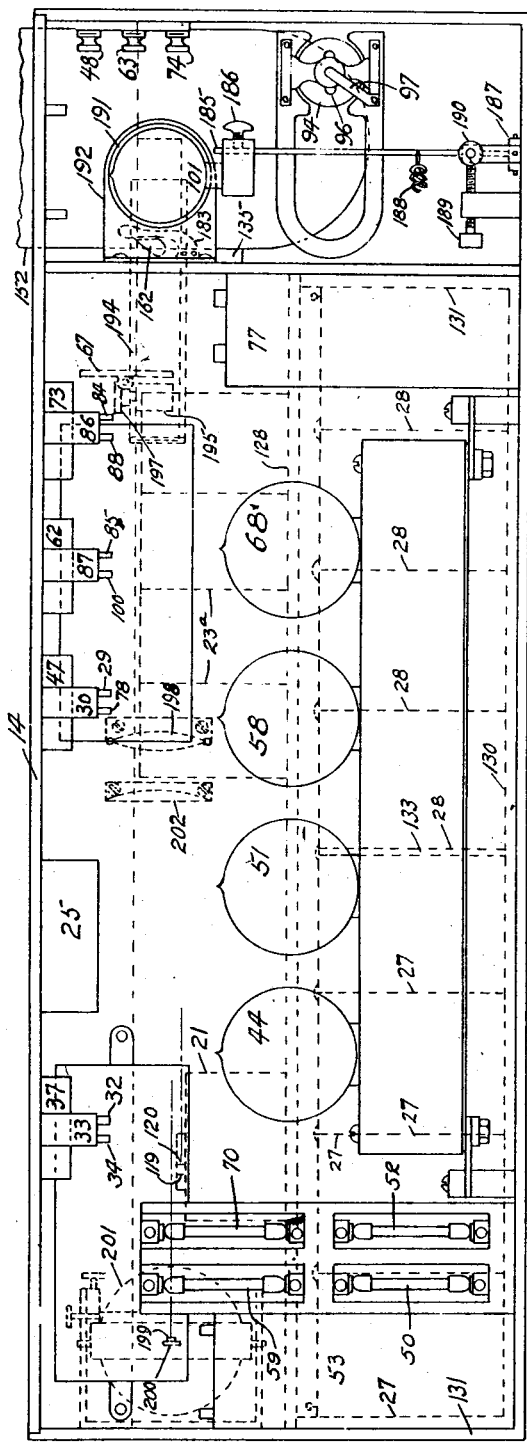
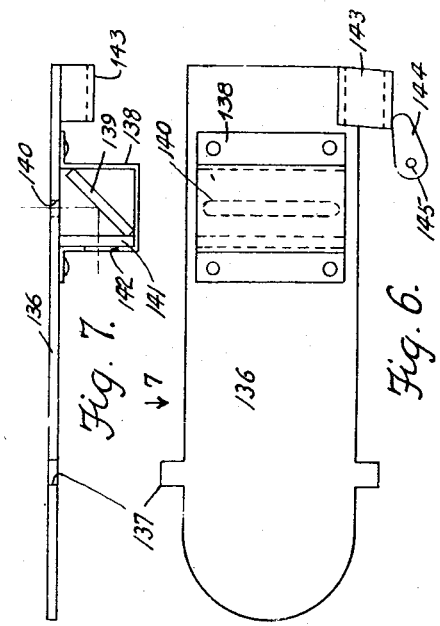
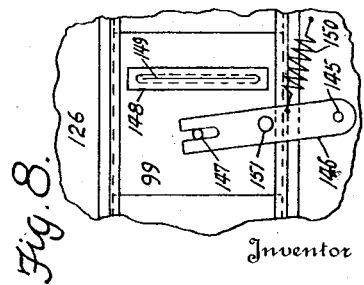
Inventor
Horace E. Nichols
John W. Dailey
Attorney

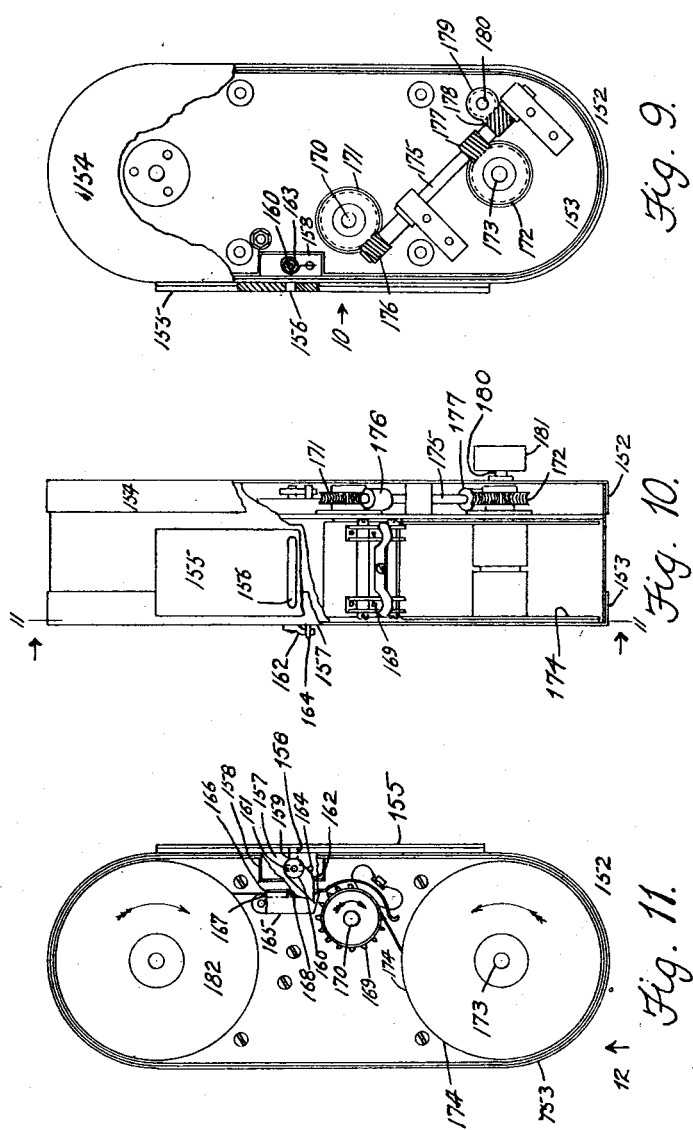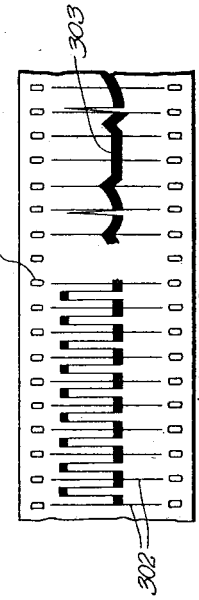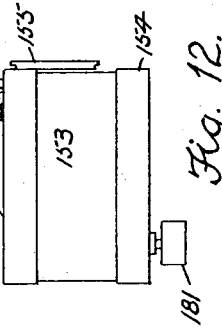

Patented Nov. 1, 1927.

1,647,711

UNITED STATES PATENT OFFICE.

HORACE E. NICHOLS, OF REDFORD, MICHIGAN, ASSIGNOR OF ONE-HALF TO CLYDE H. CHASE, OF DETROIT, MICHIGAN.

PORTABLE ELECTROCARDIOGRAPH.

Application filed May 6, 1924. Serial No. 711,357.

My invention relates to portable electrocardiographs.

Among the objects of my invention are:—

To produce an electrocardiograph which shall be simple, cheap, effective and of such weight and size as to be readily portable.

To produce an electrocardiograph which shall indicate or record the electric potential both during auricular ventricular systole or during a molecular, atomic or electronic change of any material.

To produce an electrocardiograph which shall be so constructed and arranged that it may be successfully operated by anyone.

To produce an electrocardiograph so constructed and arranged that the elements requiring adjustment may be accessible and that other elements requiring inspection and renewal may also be readily accessible for those purposes.

In the following specification, I shall describe my electrocardiograph as used for indicating or recording the electrical potential developed during auricular and ventricular systole, but it is to be understood that my electrocardiograph can be applied for indicating potential developed during the operation of any molecular, atomic or electronic change of any material.

In carrying out my invention, I may use different forms of elements and different combinations thereof, but for purposes of illustration, I shall illustrate and describe one form of elements suitable for my improved electrocardiograph and one combination of said elements and shall definitely point out in the claims novel features of my improved electrocardiograph.

In the drawings:—

Figure 3:
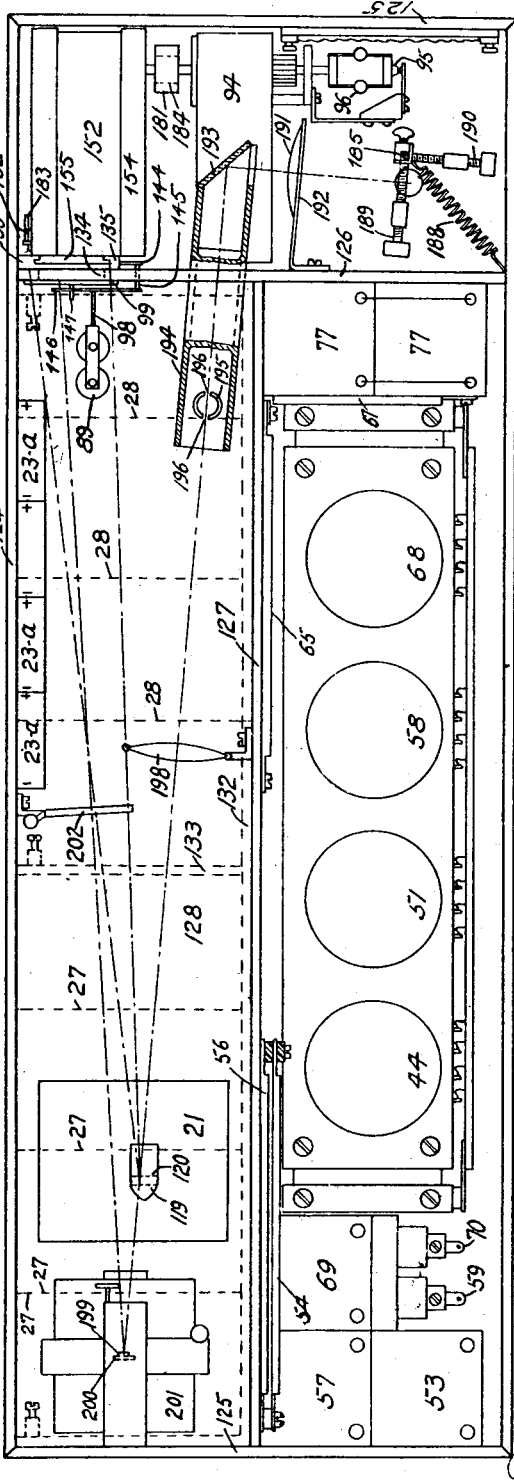

Fig. 3 is a plan view of my improved electrocardiograph with the panel 14 removed and the lamp 101 omitted in order to show underlying parts. The tube 194 is shown in section in order to illustrate the total reflecting prism and the slit mechanism.

Fig. 4 is a front elevation of my improved electrocardiograph, the front of the casing being removed.

In Figs. 3 and 4, the filament, grids and plates of the thermionic tubes are omitted.

Fig. 5 is an enlarged plan view of my finder and shutter.

Fig. 6 is a view of the parts shown in Fig. 5 looking in the direction of the arrow 6.

Fig. 7 is a view of the parts shown in Fig. 6 looking in the direction of the arrow 7.

Fig. 8 is a partial view of some of the parts shown in Fig. 5 looking in the direction of the arrow 8 in said figure.

Fig. 9 is a front view of the film case forming part of my improved electrocardiograph, the cover being partly broken away and the slide being shown partly in section.

Fig. 10 is a view of the parts shown in Fig. 9 looking in the direction of the arrow 10 in said figure.

Fig. 11 is a section along the line 11—11 in Fig. 10 looking in the direction of the arrows, excepting that part of the bottom 157 of the body portion of the film case is shown in this view.

Fig. 12 is a view of the parts shown in Fig. 11 looking in the direction of the arrow 12 in said figure.

Fig. 13 is a plan of a portion of a film and film record.

Figure 1:
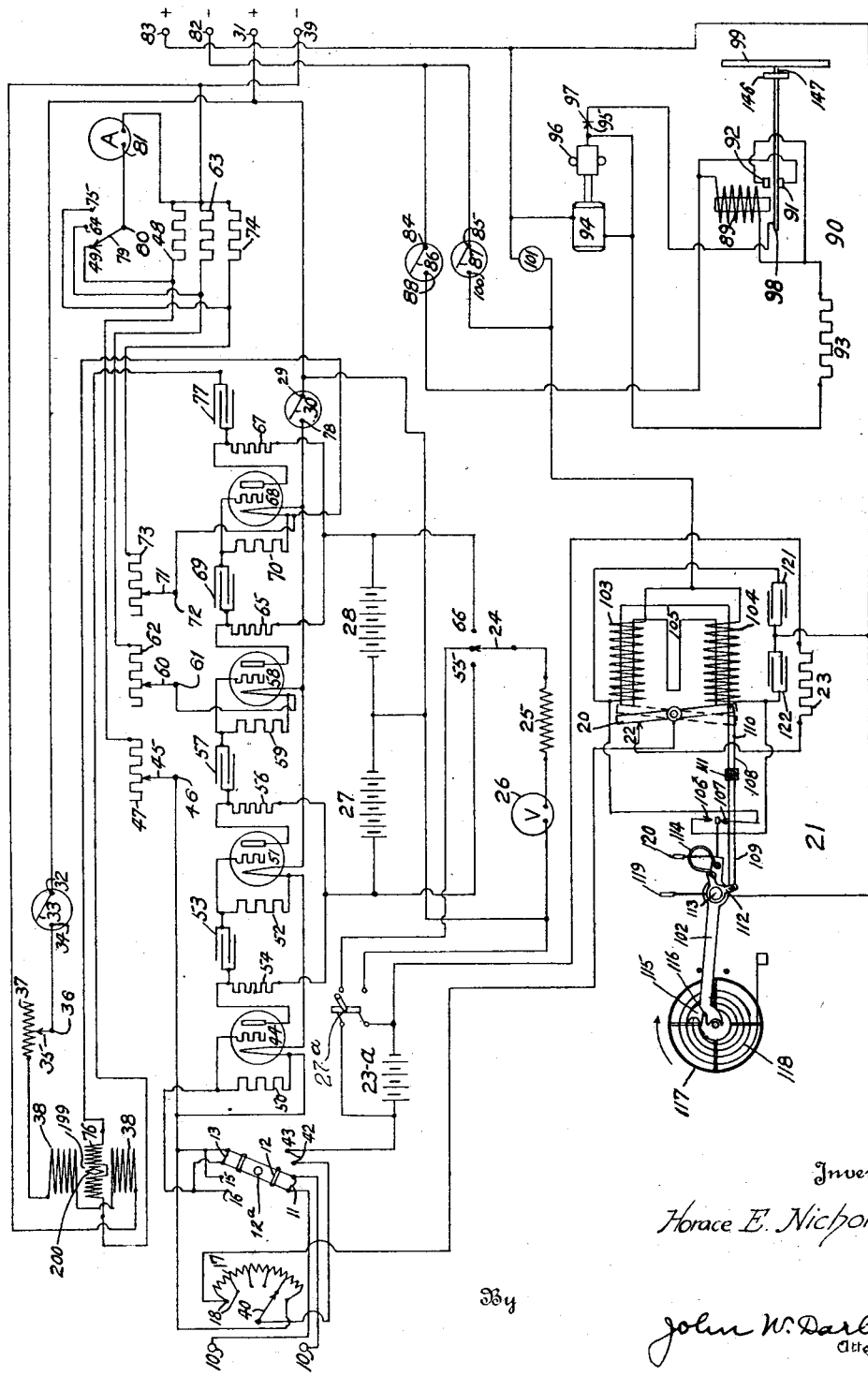
Figure 1 is a diagram of the electrical connections of my improved electrocardiograph, some of the elements thereof being shown diagrammatically and are not further illustrated.

Adverting first to Fig. 1, 10—10 are the input terminals. Said terminals are to be connected in any approved manner to the human or other body or the material, the state of which is to be indicated.

The terminals 10—10 are connected to the switch points 11—11 and said points are adapted to be connected by the levers 12—12 on a double pole switch with the points 13—13. The levers 12—12 are operated by the knob 12ª.

The points 10—10 are indicated by the legend "Heart" on the control panel 14. One of the points 13 is connected to the switch point 15 and the other is connected to the switch point 16.

The switch point 15 and the switch point 13 connected thereto are connected to one end of the calibrating resistance 17, the ends of which and intermediate portions thereof are connected to the rheostat points 18, which points are indicated by numerals from 0 to 5. A greater or less number of points 18 may be used if desired and any approved material may be used for the resistance 17.

I have found that a non-inductive resistance of 2½ ohms is suitable for the resistance 17. The other end of the resistance 17 is connected to the armature 20 of the timer 21.

The armature 20 in the position shown in Fig. 1 makes contact with the fixed point 22 and the latter is connected to one terminal of the calibrating non-inductive resistance 23 for which I have found 50,000 ohms to be a suitable resistance. The resistance 23 is connected to the negative terminal of the calibrating battery 23ᵃ which may be of 16 volts potential and the positive terminal thereof is connected to the switch point 43. The potential of the battery 23ᵃ is obtained by the voltmeter 26 which is operatively connected to the battery and a switch 27ᵃ included in the circuit.

The voltmeter switch lever 24 operated by the knob 24ᵃ is connected to one terminal of the voltmeter resistance 25, the latter being representative of any suitable voltmeter resistance, whether it be on the interior of the voltmeter or not. The other terminal of the resistance 25 is connected to one terminal of the voltmeter 26. The latter may be of any approved type.

I have found that a direct current voltmeter capable of registering to 100 volts is suitable for this purpose. The other terminal of the voltmeter 26 is connected to the negative terminals of the B-batteries 27 and 28 and is adapted to measure the voltage of said B-batteries. The voltmeter is also connected to one terminal 29 of the single pole switch 30 which on the control panel is indicated by the legend "Filaments"; also to the binding post 31, to which the positive terminal of an A-battery is to be connected; and also to one terminal 32 of a single pole switch 33 which on the panel 14 is indicated by the legend "Vib. Field", being an abbreviation of "vibrator field."

The other terminal 34 of the switch 33 is connected to the moving part 35 operated by the knob 36 which acts to include in circuit a greater or less amount of the vibrator field resistance 37 one terminal of which is connected to the coils 38—38 which produce the field of the vibrator and the other terminal of said coils is connected to the binding post 39 of an A-battery. The binding posts 31 and 39 are indicated on the panel 14 by the legend "A" and the signs + and −.

The moving part 40 which may make contact with any of the points 18 is operated by the knob 41, connected to the switch point 42, and the latter may be connected to the switch point 16. The switch point 43 may be connected to the switch point 15. These latter two connections are accomplished by operating the switch knob 12ᵃ.

The switch point 15 and a point 13 connected thereto are connected to one side of the filament of the thermionic tube 44 and also to the moving part 45 which is operated by the knob 46 which acts to include in circuit a greater or less amount of the filament control resistance 47. The resistance 47 is connected to one terminal of the ammeter shunt resistance 48 and also to the switch point 49. The point 15 and the point 13 connected thereto and the aforesaid terminal of the filament tube 44 are connected to one terminal of the grid leak 50, the other terminal of which is connected to one of the switch points 13, the switch point 16 and the grid of the tube 44.

The other terminal of the filament of the tube 44 is connected to one terminal of the filament of the thermionic tube 51 and also to one terminal of the grid leak 52, the other terminal of which is connected to the grid of the tube 51 and also to one plate of the condenser 53, the other plate of said condenser being connected to the plate of the tube 44 and one terminal of the plate resistance 54, the other terminal of which is connected to the positive terminal of the B-battery 27, the switch point 55 and to one terminal of the plate resistance 56, the other terminal of which is connected to one plate of the condenser 57, and also to the plate of the thermionic tube 51 and the other plate of the condenser 57 is connected to the grid of the thermionic tube 58 and to one terminal of the grid leak 59, the other terminal thereof being connected to one terminal of the filament of the tube 58, said terminal of said filament being connected to the moving part 60 which is operated by the knob 61 which acts to include in circuit a greater or less amount of the filament control resistance 62. The resistance 62 is connected to one terminal of the ammeter shunt resistance 63 and also to the switch point 64.

The plate of the tube 58 is connected to one terminal of the plate resistance 65, the other terminal of said resistance being connected to the positive terminal of the battery 28, the switch point 66 and to one terminal of the plate resistance 67, the other terminal of which is connected to the plate of the thermionic tube 68. The resistance 65 is also connected to one plate of the condenser 69, the other plate of which is connected to the grid of the tube 68 and to one terminal of the grid leak 70, the other terminal of which is connected to one terminal of the filament of the tube 68. Said terminal of said filament is connected to the moving part 71, operated by the knob 72, which acts to include in circuit a greater or less amount of the filament control resistance 73. The resistance 73 is connected to one terminal of the ammeter shunt resistance 74 and also to the switch point 75. Said terminal of said filament is also connected to one terminal of the needle magnetizing coil 76 of the vibrator, the other terminal of which is connected to one plate of the condenser 77, the other plates of said condenser being connected to one terminal of the resistance 67 and the plate of the tube 68.

The terminals of the filaments of the tubes 51, 58 and 68, not hereinbefore adverted to, are connected together and to the terminal 78 of the switch 30, and the filaments of the tubes 44 and 51 have been placed in series and adjusted by one rheostat, independent of the other tubes because the tubes 44 and 51 are different from the tubes 58 and 68. The difference being simply one of convenience.

The switch lever 79 operated by the knob 80 is arranged to make contact with any one of the points 49, 64 or 75 and said lever is connected to one terminal of the moving coil of the ammeter 81.

I have found that non-inductive resistances having the following values are suitable:—For the grid leaks 50, 52, 59 and 70—2 megohms; for the plate resistances 54, 56 and 65—300,000 ohms; for the plate resistance 67—25,000 ohms; for the resistances 47, 62 and 73—5 to 10 ohms; for the resistances 48, 63 and 74, a resistance suitable to bring the maximum current within the range of the ammeter 81.

The moving coil of the ammeter 81 revolves in a fixed magnetic field and one terminal thereof is connected to one terminal of each of the resistances 48, 63 and 74, said terminals being also connected to the coils 38—38 and the binding post 39.

Any suitable battery has its terminals connected to the binding posts 82 and 83. The binding post 82 is connected to the terminals 84 and 85 of the single pole switches 86 and 87.

The terminal 88 of the switch 86 is connected to one terminal of the magnet 89 of the shutter mechanism 90 and also to the fixed contact point 91. The other terminal of said coil is connected to the fixed contact point 92 and also to the fixed non-inductive resistance 93, amounting to about 6 ohms. The other terminal of said resistance is connected to one terminal of the motor 94 and also to the contact 95 which is operated by the centrifugal governor 96, the latter being driven by the motor 94.

The contact 95 is arranged to make and break connection with the fixed contact 97 and the latter is connected to the armature 98 of the magnet 89. The armature 98 operates the shutter 99 to open same when a film hereinafter described attains a proper recording speed. The other terminal of the motor 94 is connected to the binding post 83, and the fixed resistance is essential in the control of the motor 94. For instance, the motor circuit is from post 83 to the motor 94, to the contacts 95 and 97, through armature 98 and contact 91 to switch 86 and post 82. If motor speeds up, the governor 96 is brought into action to separate contacts 95 and 97 and the circuit is then as follows: post 83 to motor 94, resistance 93 to electromagnet 89, switch 86 to post 82. Electromagnet 89 is energized and armature 98 shifted to contact 92 and the motor circuit is unchanged. When the motor 94 slows due to resistance 93 in the circuit, the governor 96 closes contacts 95 and 97 and the circuit is from post 83 to motor 94, to contacts 95 and 97, armature 98, contact 92, electromagnet 89, and switch 86 to post 82, thus causing the motor 94 to increase its speed.

The terminal 100 of the switch 87 is connected to one terminal of the lamp 101 which may be of any voltage suitable for the battery that is connected to the terminals 82 and 83 and I have found that 21 candle power is suitable for the optical portion of my improved electrocardiograph. The other terminal of the lamp 101 is connected to the motor 94; to the binding post 83; to the escapement lever 102 of the timer 21.

The terminal 100 is also connected to one terminal of each of the coils 103 and 104 of the timer magnet 105 which is horizontally disposed. The other terminal of the coil 103 is connected to the fixed contact point 107 and the other terminal of the coil 104 is connected to the fixed contact point 106. The magnet 105 comprises three limbs. Upon one the coil 103 is wound; upon another the coil 104 is wound and the central limb is unwound. There is, consequently, a pole for either of the other limbs so that if a current of electricity passes through the coil 103, the armature 20 will be directed to the position shown by dotted lines in Fig. 1. If a current of electricity passes through the coil 104 the armature 20 will be directed to the position shown by full lines in Fig. 1.

The armature 20 is articulated to the connecting rod 108 which is formed of the portions 109 and 110, said portions being separated by the insulator 111.

The rod 108 is connected to the bell crank lever 112 which oscillates upon the pivot 113 and the other end of said lever is connected to one end of the toggle spring 114, the other end of which is connected to the lever 102 which oscillates upon the pivot 113 and carries at its left end, (see Fig. 1), the fork 115 which is acted upon by the pin 116 mounted in the balance wheel 117 to produce a continuous vibratory motion of the lever 102 as hereinafter described.

The spring 118 maintains an approximately synchronous movement of the balance wheel 117, being so adjusted with reference to said wheel that it tends to move the pin 116 into alignment with the centers of the axes of said wheel and the pivot 113.

The ends of the spring 114 are wrapped around pins positioned in the lever 102 and the bell crank 112 in such a manner that said spring may rotate within limits about either of said pins. In Fig. 1 the left end of the spring is shown just past its dead center position upwardly, and in this position the spring 114 exerts very little force tending to move the right end of the lever 102 downwardly. When the armature 20 is moved to its dotted position, thus moving the lower end of the bell crank 112 to the left, the left end of the spring 114 is moved downwardly by the rotation of the bell crank past the dead center position hereinbefore mentioned and thereafter, the spring 114 exerts an upward force upon the right end of the lever 102, thus moving the left end of said lever downwardly. This assists the motion of the pin 116 in the direction of the arrow and also, increases the angular velocity of the balance wheel 117 for purposes hereinafter explained.

The mirror 119 is vertically disposed and mounted upon the vertically disposed lever 112 and the shutter 120 is mounted upon the lever 102 for purposes hereinafter explained. The vertically disposed lever 102 makes contact alternately with the points 106 and 107, and in order to prevent undue arcing at these points and the generation of electric waves by said arcs, I preferably connect the plate of each of the condensers 121 and 122 to the lever 102 and connect the other plate of the condenser 121 to the point 107 and the other plate of the condenser 122 to the point 106.

Figure 2:
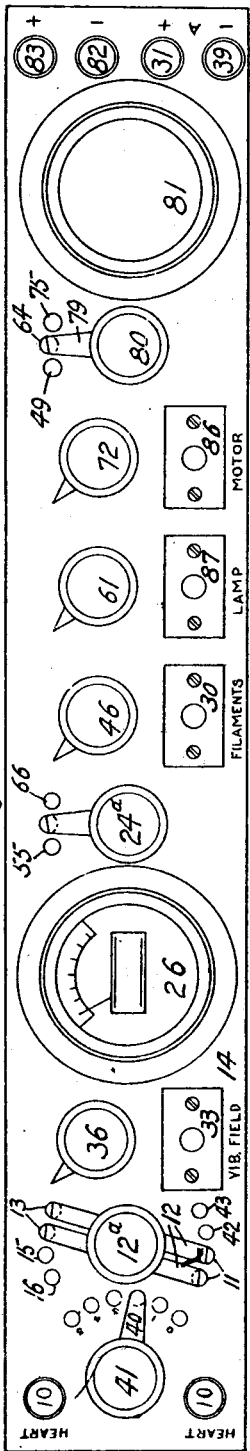
Fig. 2 is a plan view of the control panel.

The parts of my improved electrocardiograph are contained within the casing composed of the front 123, the back 124, ends 125—125 and the partitions 126, 127 and 128 and bottom 129. The panel 14 covers the front half of the top of the casing, i. e., that included between the front 123, ends 125—125, partitions 126, 127 and the space enclosed by extension of the latter. The upper right hand portion of the casing as viewed in Fig. 3 is left open for purposes hereinafter explained, and the remainder of the casing is closed by a hinged cover, not shown, thus making this portion impervious to external light rays during operation. In addition to the legends already noted, legends are placed upon the panel 14, as shown in Fig. 2. The partitions 126, 127, 128 and bottom 129 form a space for the reception of the drawer composed of the bottom 130, ends 131—131 and front 132. Said drawer is divided into two parts by a partition 133; the B-battery 27 is mounted in said drawer to the left of the partition 133, and the B-battery 28 is mounted therein to the right of said partition, (see Figs. 3 and 4).

The battery 23ª is preferably secured to the back 124 above the partition 128. The shutter 99 closes a hole 134 provided in the partition 126 when the armature 98 is in the position shown in Fig. 1. Guides 135—135 are secured upon the partition 126 adjacent the hole 134 for the reception of the slide 136 (Fig. 6) therein.

The finder which I use in calibrating and adjusting my improved electrocardiograph will now be described:—

The slide 136 is provided with ears 137 which contact with the top of the guides 135 and determine the correct position of the finder. A reflector box 138 is secured to the slide 136 and contains therein a mirror 139 located to reflect rays which arrive through the slot 140 upwardly through the ground glass 141 and slot 142. A lug 143 is secured upon the slide 136 and said lug in the lowest position of said slide moves the arm 144 to the position shown in Fig. 6. The arm 144 is secured upon the shaft 145 and said shaft extends through the partition 126 and upon the left of the partition 126 the arm 146 is secured to said shaft. The arm 146 comprises the slot which embraces a pin 147 in the shutter 99 and the latter comprises the slot 148 which when the parts are in the positions shown in Figs. 6 and 8 is symmetrical with reference to a hole, not shown, in the partition 126, to the slit 149 and to the slot 140 in the slide 136.

A spring 150 is secured at one end to the arm 146 and at the other, to the partition 126, and serves to move the shutter 99 to close the slit 149 as hereinafter explained. The hole 151 is provided in the arm 146 for the reception of the end of the armature 98.

The film case 152 which contains the film upon which is produced a record of the varying electropotentials applied to the terminals 10 will now be described:—

The film case 152 consists of a body portion 153 and a cover 154. To the body 153 there is secured the slide 155 which is shaped to slide within the guides 135 and is provided with a slot 156 that registers with the slit 149, when the case 152 is placed in the position shown in Fig. 3. To the inner side of the body portion of the film case there is secured a block 158 which is provided with a slot 159 that registers with the slot 156 and with a cylindrical hole in which is revolubly mounted the shaft 160, said shaft being provided with a longitudinal slot 161 therethrough of approximately the same width as the slot 159. The shaft 160 has a reduced end which extends through the bottom 157 and there is secured on said end the pawl 162 for a purpose hereinafter explained. The other end of the shaft 160 is likewise reduced and there is secured thereto a spring 163 which normally keeps the pawl 162 against the pin 164.

The film guide 165 (Fig. 11) is secured adjacent the block 158 and comprises portions 166 and 167 for guiding a film, the former being provided with a slot 168 for a purpose hereinafter explained.

The film case is provided with spools for the reception of a film 300 such as is used in motion picture work and said film is drawn between the portions 166 and 167 by the sprocket wheel 169, the teeth of which extend into the holes in said film. A portion of this film is shown in Fig. 13. The sprocket wheel 169 is mounted on the shaft 170 and the worm wheel 171 is also mounted on said shaft. A worm wheel 172 is mounted upon the shaft 173 and the take-up spool 174 is driven by said shaft by means of any frictional device secured to said spool for producing a gentle friction with the shaft 173.

A shaft 175 is revolubly mounted in the case and worms 176 and 177 secured thereon mesh, respectively, with the wheels 171 and 172. A spiral pinion 178 secured to the shaft 175 meshes with the spiral pinion 179, the latter being mounted on the shaft 180 which extends through the top of the case and is provided with the spiral pinion 181. The magazine spool 182 is mounted in any approved manner at the top of the film case.

When the film case 152 is placed in the position shown in Figs. 3 and 4, the finger 183 contacts with the pawl 162 and moves it from the position shown in Fig. 11 to the position shown in Fig. 4, thus moving the slot 161 into alignment with the slots 159 and 168. During the introduction of the case 152 into the position shown in Figs. 3 and 4, the pinion 181 is meshed with the spiral pinion 184 of the motor 94.

The lamp 101 is mounted in a socket that may be adjustably secured in any position upon the rod 185 by the set screw 186. The rod 185 is secured at the bottom to one member of the universal joint 187 and the latter is secured to the bottom 129.

The spring 188 presses the rod 185 against the ends of the adjusting screws 189 and 190 so that by varying the position of these screws, the position of the lamp with reference to condensing lens 191 may be adjusted, the latter being supported upon the partition 126 by the bracket 192.

Rays from the lamp 101 are condensed by the lens 191 and impinge upon the reflecting prism 193 which reflects the light through the tube 194 in which is mounted the beam adjuster 195 provided with slots 196. The adjuster 195 can be revolved by the knob 197 in order to produce a beam of light as wide as the receiving portion of the film 300, which beam is focused by the lens 198 upon the mirror 199 secured to the vibrating magnet 200 of the vibrator 201.

The beam after being reflected from the mirror 199 passes through the condensing cylindrical lens 202 which focuses a narrow beam of light upon the slit 149.

It is to be noted that the beam adjuster 195 does not extend completely across the tube 194, (see Fig. 4) ; consequently, rays from the prism 193 pass thereunder, through the lens 198, upon the mirror 119 and upon the shutter 120 of the timer 21 which is from time to time removed from the path of said beam and allows it to fall upon the mirror 119 which directs a broad beam of light through the lens 202 upon the slit 149.

In adjusting my improved electrocardiograph, the slide 136 of the finder is inserted within the guide 135 and during the insertion the shutter 99 is moved to register with the slit 149. The switch 87 is then moved to apply electricity to the lamp 101, the rays from which fall upon the mirror 119 and the mirror 199. When electricity is applied to the lamp 101, a current flows through the lever 102 and through the contact 107. The coil 103 is energized and the armature 20 is moved to the position shown by dotted lines in Fig. 1. This moves the mirror 119 toward the right about the pivot 113 and the reflected beam of light from the mirror, said reflected beam being initially above the incident beam, flashes the beam downwardly across the slit 149, producing a thin line image the slit 149 which may be observed through the ground glass 141. At this time the balance wheel 117 starts moving in the direction of the arrow, being assisted in this motion by the force of the spring 114 which is now acting upwardly upon the right end of lever 102 tending to carry the left end of said lever downward. This motion of lever 102 also carries the shutter 120 attached thereto into the path of the beam of light, cutting off same from the mirror 119. The lever 102 also breaks contact with contact 107 and makes contact with contact 106, thereby de-energizing coil 103 and energizing coil 104. Armature 20 therefore moves to the position shown in full lines and this carries the bell crank 112 and the mirror 119 attached thereto back to the position shown in Fig. 1. During this operation the shutter 120 is in its upward position and cuts off the light beam from the mirror 119. The return of mirror 119 to the position shown is therefore not accompanied by any light reflection and a flash is not registered across the slit 149. The balance wheel 117 having completed its motion in the direction of the arrow now returns, moving in the direction opposite to that shown by the arrow. Spring 114 assists this return of the balance wheel by its reverse action. The cycle of operation is completed when lever 102 returns to the position, shown in Fig. 1, which moves the shutter 120 out of the beam of light so that the beam strikes the mirror 119 as before and the cycle is repeated.

It is obvious that by properly timing the balance wheel 117, images of the slit represented by the calibrations 302, Fig. 13, may be produced upon the film at stated intervals which thus offer means for determining the time intervals between characters 303 in the graph on the film which is coordinated to the potentials applied to the terminals 10.

With the timer working as just described, the operator observes the images of the beams from the mirrors 119 and 199 which appear upon the ground glass 141, (see Figs. 6 and 7), it being understood that the rays of light from the lamp 101 are also reflected from the mirror 199 during the test.

The operator then operates the switch 30 to apply the filament current to the thermionic tubes and then adjusts the filament currents by turning the knobs 46, 61 and 72 until the proper reading for each filament current is obtained in the ammeter 81. When the operator turns the knob 46 he moves the knob 80 until the lever 79 is upon the contact 49, and similarly, when turning the knobs 61 and 72, he moves said lever to make connection with the switch points 64 and 75, respectively. The switch 33 is then to be closed in order to apply a current of electricity to the coils 38.

The operator then connects the object whose variations in potentials are to be observed or recorded to the terminals 10 and turns the knob 36 to vary the intensity of the vibrator field and thus vary the vibrations of the mirror 199, at the same time noting the effect in the ground glass 141. He continues this adjustment until the vibrations of the beam indicated in said glass are within the proper limits. During these tests, the levers 12 are in the positions shown in Fig. 2.

The operator then removes the finder and inserts the film case 152. During the insertion of said case, the finger 183 strikes the pawl 162 and moves the shaft 160, bringing the slot 161 into alignment with the slot 159.

At times it may be desirable to determine the value of the potentials applied to the terminals 10 and in order to determine said values, the levers 12 are moved to contact with the points 15, 16, 42 and 43, thus disconnecting the terminals 10 from the first thermionic tube 44 and connecting to said tube the lever 40 and the terminal of the resistance 17.

When the point 22 is in contact with the armature 20, a current of electricity is sent through the resistance 17, thus developing a potential upon the terminals thereof, the magnitude of which can be varied by moving the lever 40 along the points 18. Thus, the potential at the terminals of the resistance 17 is substituted for the potential applied to the terminals 10, is magnified by the tubes 44, 51, 58 and 68 and produces a calibrating graph upon the film each time that the armature 20 contacts with the point 22, the ordinates of which are proportional to the voltage at the terminals of the resistance 17, which is readily determinable as being a product of the known value of the resistance corresponding to that one of the points 18 with which the lever 40 contacts and the current flowing, which is the quotient of said resistance plus the resistance 23 into the potential of the battery 23$^a$.

From the foregoing it is to be noted that my improved electrocardiograph consists of sources of electric potential combined with means for stepping up the potential applied to the terminals 10; means for producing a movement of a mirror coordinated to the variations of the potentials applied to the terminals 10; a source of light, an optical system for causing a narrow ray of light to impinge upon said mirror, a film for recording the movements of said mirror, and a source of power for moving said film; a shutter controlled by a centrifugal governor operated by the source of power so that said shutter will be open when the film attains the proper recording speed; a second shutter and a mirror positioned to receive light rays from said optical system and operated by a vibrating armature, the period of whose vibrations is controlled by a balance wheel deriving power from the movements of said armature; a finder which can be mounted in place of the film case and used to adjust the instrument preparatory to the introduction of the film case within the instrument, said finder having means for operating the first named shutter and said case also having means for operating said shutter by its placement within the instrument; and means for recording the graph of known potential whereby the values of the unknown potentials impressed upon the terminals of the electrocardiograph may be determined.

Moreover, the aforementioned parts have been so proportioned and correlated that their association in a single casing, which is neat, compact and readily portable, has been effected. My invention, therefore, has distinct advantages over the present permanent installations of laboratory apparatus now in use, which requires the bringing of the patient to the instrument. The degree of skill necessary for operation of the apparatus has been decreased, thereby increasing its range of usefulness.

I claim:—

1. A method of recording variations in potential induced by the activities of living organisms, and wherein beams of light and a film are used as an effective means of recording, which method consists in amplifying said potentials, reflecting the beams of light in the direction of the film, translating said amplified potentials into a vibratory interference for one reflected beam of light, and causing periodical flashes of the other reflected beam of light so that the periodic reception of one beam of light is comparable with the vibratory reception of the other beam of light.

2. In an electrocardiograph, the combination of a source of light, a movable mirror, a movable shutter positioned between said source and said mirror, a vibrating armature for controlling the movements of said mirror and shutter whereby the passage of light rays to said mirror are periodically suppressed, a balance wheel for controlling the vibration period of said armature, and a recording film for the reception of the rays reflected from said mirror.

3. In an electrocardiograph, the combination of a casing having a partition provided with a slit, a source of light mounted in said casing, a mirror so positioned that the incident rays from said source are reflected to an opaque portion of said partition, means for moving said mirror whereby said reflected rays effect a transit over said slit, a shutter, means for returning said mirror to said first named position, and means for interposing said shutter between said source and mirror during said return.

In testimony whereof, I affix my signature.

HORACE E. NICHOLS.